United States Patent [19]

Howland

[11] 4,325,224
[45] Apr. 20, 1982

[54] METHOD AND APPARATUS FOR TRANSPORT REFRIGERATION SYSTEM CONTROL

[75] Inventor: Leland L. Howland, Belle Plaine, Minn.

[73] Assignee: Thermo King Corp., Minneapolis, Minn.

[21] Appl. No.: 145,190

[22] Filed: Apr. 29, 1980

[51] Int. Cl.³ .................... F25B 41/00; F25B 29/00
[52] U.S. Cl. .................... 62/196 A; 62/228; 165/26; 236/1 E
[58] Field of Search ........... 62/228, 229, 158, 228 B, 62/228 C, 196 R, 196 A; 236/1 EA, 1 E; 165/26

[56] References Cited

U.S. PATENT DOCUMENTS 3,500,898  3/1970  Gerhart, Jr. et al. ............. 165/26
4,228,846  10/1980  Smorol ............................ 62/228

Primary Examiner—Albert J. Makay
Assistant Examiner—Harry B. Tanner
Attorney, Agent, or Firm—E. C. Arenz

[57] ABSTRACT

A transport refrigeration system having the capability of either heating or cooling at high or low speed and with the compressor loaded or unloaded is controlled by a temperature control system including a heat relay 1K and a speed relay 2K, and has an auxiliary control relay CR which is operative to maintain the compressor speed at a low speed in the temperature band 48 closely above and below the setpoint temperature, and will further maintain the low speed of the compressor for a predetermined time as the temperature rises above or below the narrow temperature band through time delay means 46 which, if uninterrupted in operation for the predetermined time period will drop out the control relay so the system can resume higher speed operation.

12 Claims, 3 Drawing Figures

METHOD AND APPARATUS FOR TRANSPORT REFRIGERATION SYSTEM CONTROL

BACKGROUND OF THE INVENTION

1. Field of the Invention

The invention relates to control of transport refrigeration systems of the type that have at least heating and cooling capabilities and dual compressor speed capability.

2. Description of the Prior Art

One typical transport refrigeration system such as is used to cool and at times heat a trailer or the like is controlled thermostatically by what is considered in the art to be a four stage controller. If the system has the capability of dual speeds along with the capability of either heating or cooling, the normal mode of four stages of operation with successively descending temperatures in the trailer would be as follows: high speed full cool, low speed full cool to the setpoint temperature, low speed full heat, and high speed full heat. With ascending temperatures from well below the setpoint to well above the setpoint temperature, the reverse order of stages of operation prevails.

With some systems, capacity reduction is also available, and then the successive stages of operation with sensed temperatures from well above to well below the setpoint temperature are: high speed full cool, low speed part cool, low speed part heat, and high speed full heat. Again, the reverse order of stages of operations prevails with ascending temperatures.

It is to be noted that in the first arrangement low speed part cool and low speed part heat are not available, while in the second arrangement low speed full cool and low speed full heat are not available.

Systems as above described have been commercially available for a number of years from the assignee of this application. They use an electronic thermostat basically comprising three temperature responsive switch means controlling a pair of relays, one of which has been characterized as a speed relay and the other as a heat-cool relay. Such a device in electronic form is available from the assignee under the trademark "Thermoguard".

It would be relatively desirable, in my estimation, if additional stages of control were not only available, but were also able to be obtained using a tried and proven thermostat such as noted above and with only a reasonable increase in cost in obtaining the additional stages of operation. It is the aim of this invention to provide a method and system in which these desirable results are obtained as well as other benefits derived from the arrangement of the invention.

SUMMARY OF THE INVENTION

In accordance with the invention, in a transport refrigeration system having at least heating and cooling capabilities and dual compressor speed capability, and with at least four stages of operation produced in accordance with temperatures in the served space varying more or less above and below the setpoint temperature of the served space, the method of controlling by operating the compressor at a lower speed when the temperatures in the served space are in the relatively close range above and below the setpoint temperature, and overriding a call for operation of the compressor at the higher speed when sensed temperatures in the served space move either above or below the relatively close range until at least a predetermined period of time has elapsed with an uninterrupted call for higher speed operation existing, and then operating the compressor at the higher speed.

In that method of operation, when the system also includes a capability of unloading the compressor, the additional method of control includes operating the compressor in at least partly unloaded condition in response to the served space temperature being in the relatively close range of temperatures, and shifting the compressor operation to a more fully loaded condition as the temperature in the served space moves either above or below the relatively close range while maintaining the lower speed of the compressor through the overriding operation noted above.

In providing a system adapted to carry out the method, and in which the system includes the prior art arrangement of first and second relay means being responsive to temperatures in the served space to give a number of stages of operation in accordance with the difference in temperature of the served space from the setpoint temperature, and with two of the stages including low speed compressor operation in the temperature band encompassing temperatures closely above and below the setpoint temperature, the arrangement is provided with auxiliary control relay means including switch means in a circuit controlling compressor speed, with time delay means being connected to control operation of the auxiliary control relay in a timed operation in accordance with the condition of a speed relay, the auxiliary control relay operating to maintain the compressor speed at a lower level until the time delay means operates to change the condition of the auxiliary control relay to change the compressor speed to a higher level in accordance with the speed relay calling uninterruptedly for a predetermined time for compressor speed at a higher level. Where the system also includes the capability of high and low capacity compressor operation, the control relay also includes switch means in the circuit controlling the unloading operation as well as another switch of the speed relay so that it is also possible to have an operation of either full cool or full heat at a lower speed for a period up to the expiration of the predetermined time under a call for full speed operation by the speed relay.

DESCRIPTION OF THE PREFERRED EMBODIMENT

Figure 1:
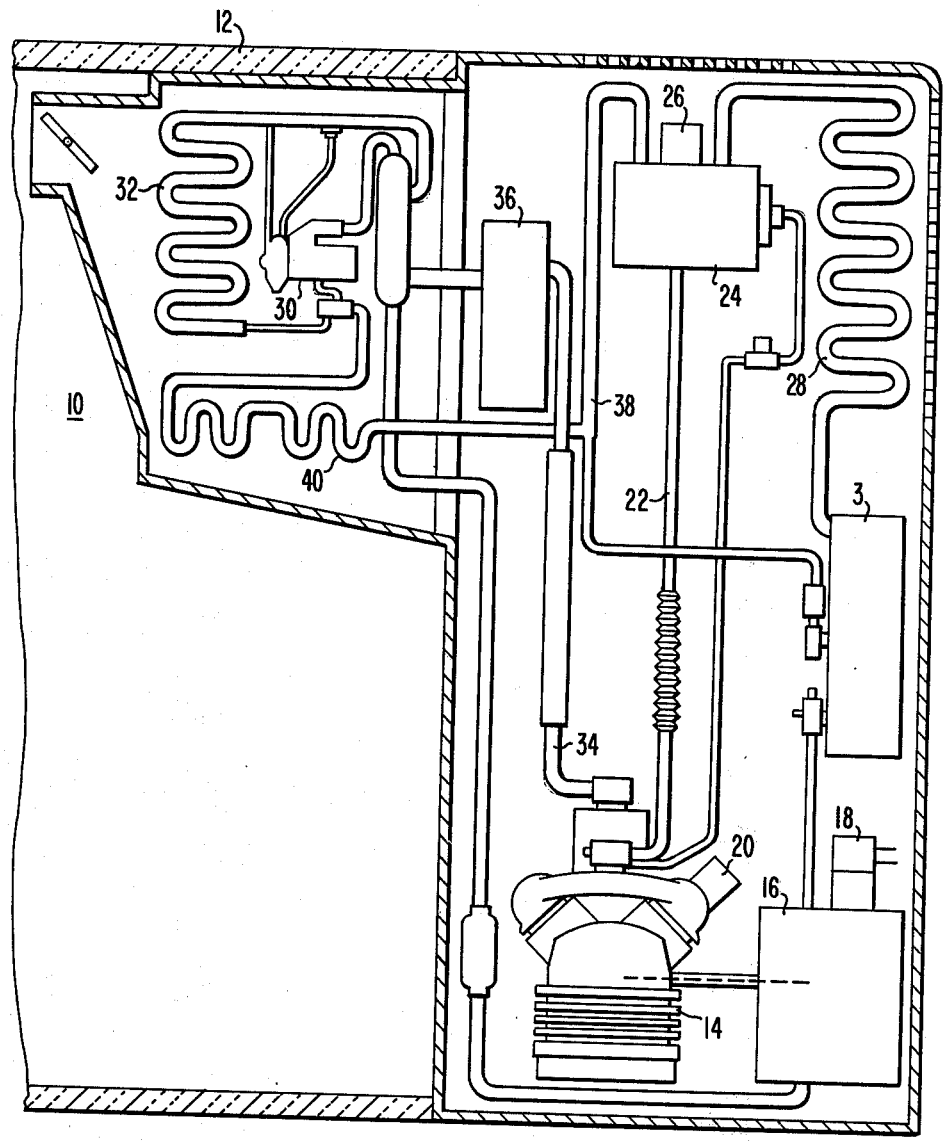
FIG. 1 is a schematic view of the main parts of a transport refrigeration system of the type to which the invention is applied for example.

Referring to FIG. 1, a transport refrigeration system of basically conventional parts is provided to serve the space 10 within an insulated trailer or the like. Most of the main parts are shown in schematic form, since the system shown is considered conventional for purposes of this application and has been available from the assignee of this application.

A refrigerant compressor 14 is driven by a dual speed prime mover such as a dual speed internal combustion engine 16. It will be appreciated that the prime mover may alternatively be a dual speed electric motor if the unit is of the type which can be powered by either an engine or a motor. For purposes of example, the prime mover is an engine including a throttle with an electrically operable solenoid 18 controlling the throttle to obtain the two different speeds. The compressor may be of the type which is unloadable through operation of unloading means controlled by an unloading solenoid 20, for example, shown in connection with one of the cylinder heads.

The compressor 14 discharges hot gas through line 22 to the three-way valve 24 controlled by solenoid 26. In a cooling operation, the hot gas is passed through the condenser 28 where it is condensed and flows to the receiver and thence through various lines and devices to an expansion valve 30, refrigerant evaporator 32 and back to the suction line 34 of the compressor through accumulator 36.

In a heating and a defrosting operation, the pilot solenoid 26 is energized to move the three-way valve 24 to the opposite position so that the hot gas is discharged through line 38 to a defrost pan heater 40 and thence through the evaporator 32 in the reverse direction relative to a cooling operation.

The means for providing air flow through the two sections of the refrigeration unit are not shown since they are readily known in the art. Basically, air from the served space 10 is drawn into the evaporator section and discharged back into the served space, while outdoor air is brought into the section with the condenser 28 and passes therethrough back to ambient. The refrigeration system thus far described is well known in the art.

Figure 2:
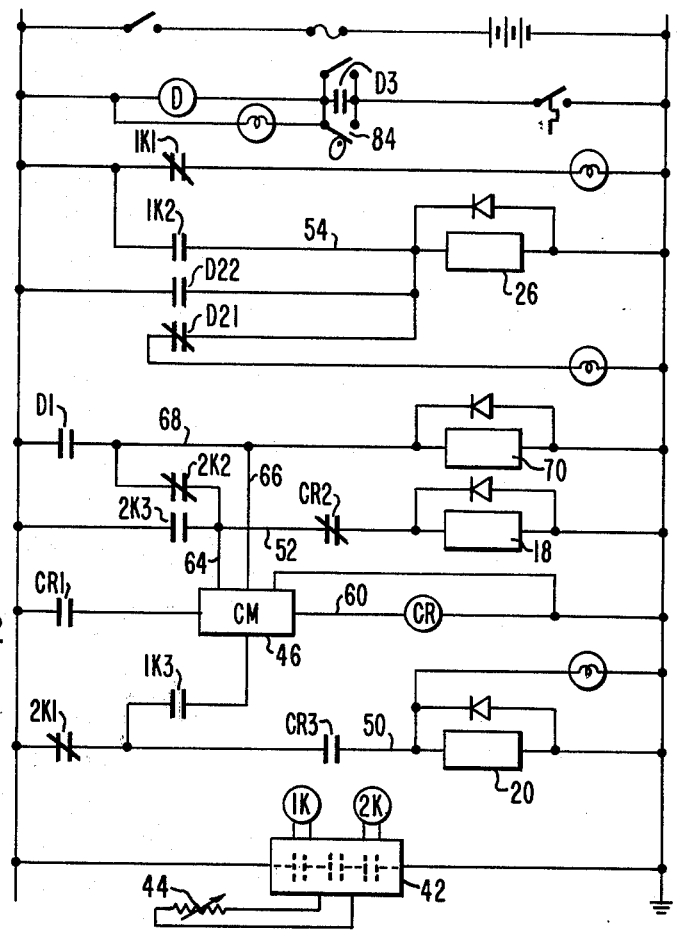
FIG. 2 is a schematic diagram of one form of control system according to the invention.

Referring to FIG. 2, a circuit arrangement for controlling the refrigeration system of FIG. 1 in accordance with the invention is shown. For purposes of description, the invention will be explained in connection with the use of an electronic thermostat generally designated 42 which is of conventional construction and available from applicant's assignee under the trademark identification "Thermoguard". Such a thermostat includes a sensor 44 for sensing the temperature in the served space 10, as a series of essentially three switch means shown in dashed lines in the thermostat and not separately identified, and a first and second relay 1K and 2K, respectively, these relays typically being called the heat relay and the speed relay, respectively, since in a conventional prior art system the switch means controlled by the relays control those two quantities mainly.

As will be apparent to those versed in this art, the circuit arrangement in FIG. 2 is not complete with respect to total control of the refrigeration system, but is limited for the most part to those aspects of the control with which this invention deals. Thus, parts relating to starting of the engine, safety switches, starter-generator, for example, are omitted for purposes of simplicity.

Both the first or heat relay 1K and the second or speed relay 2K control switch means which are located in the various particular circuits and their control is identified by the identical prefixes 1K and 2K.

In accordance with the invention, an auxiliary control relay CR is provided which controls its switch means CR1, CR2 and CR3 in various circuits in accordance with energization of CR. Additionally, a control monitor 46 functions to control energization of the control relay CR in accordance with time and in accordance with the concurrent condition of the various circuits. The switching control of the control monitor 46 is internal and accordingly is not shown. The device is identified as an FC119 timer of Syracuse Electronics Corporation, Syracuse, New York. Its particular function in connection with a circuit according to the invention will be explained in some detail in the description of operation of the circuit.

Additionally, the defrost control is shown in the circuit, the defrost cycle being actuated by energization of the defrost relay D and its controlled switches, D1, D21 and D22 and D3.

OPERATION

Figure 3:
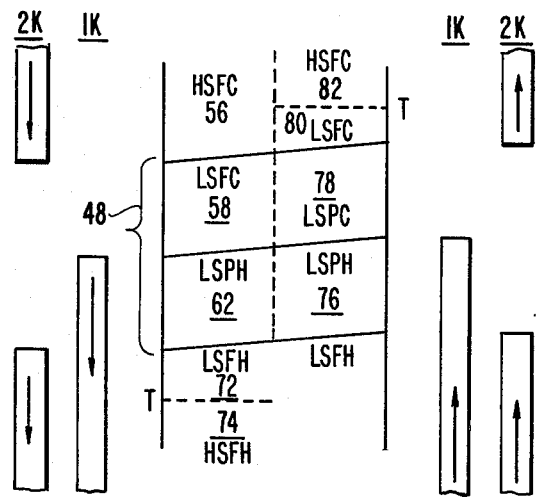
FIG. 3 is a representation of the relay and switch sequence as temperatures and time change under different conditions of operation.

To aid in quickly grasping the operation of the circuit and the sequence of the Thermoguard relays in connection with the circuit, reference should be had to FIG. 3. The left side of the intermediate block corresponds to a sequence of descending temperatures from well above the setpoint temperature through the intermediate band 48 of temperatures closely above and below the setpoint temperature to a temperature well below the intermediate band 48. The setpoint temperature of course corresponds to the nearly horizontal line at the center of the band 48. The right side corresponds to rising temperatures in the served space from well below the setpoint to well above the setpoint.

The three thermostatically controlled switch means of the particular Thermoguard used as an example result in the relay 2K being energized at temperatures both above and below the intermediate band as indicated by the columnar bars in the 2K columns. The 1K relay is energized at the setpoint with descending temperatures and remains energized at any temperature below the setpoint as indicated by the bars in the 1K columns.

The abbreviations such as HSFC and so on are abbreviations for the mode of operation in the particular block of the central figure, and will become apparent as the description proceeds.

Referring now to both FIGS. 2 and 3, the switch means in FIG. 2 are shown in their positions corresponding to all of the relays being deenergized and corresponding to the top part of the band 48.

Now assuming the temperature in the served space is well above the setpoint and the intermediate band 48 temperature, the relay 2K will be energized in a high speed full cooling operation afforded by the circuit as follows. 2K1 in the loading circuit 50 will open and accordingly the loading solenoid 20 will be deenergized giving full loading of the compressor. 2K2 will open while 2K3 closes. Closed 2K3 along with closed CR2 and the throttle or speed solenoid 18 in the speed circuit 52 will result in energization of the speed solenoid and accordingly operation at high speed. Since the relay 1K is deenergized at this time, the pilot valve circuit 54 will be deenergized and accordingly the pilot solenoid 26 controlling the pilot valve 24 (FIG. 1) will be deenergized with the valve accordingly in a position for a cooling operation. Hence, with this condition described, the operation of the refrigeration system is at high speed full cool (HSFC). This operation of course corresponds to block 56 in FIG. 3.

As the served space temperature decreases to a level corresponding to the upper part of the temperature band 48, the 2K relay will be deenergized. While switch 2K1 closes in the loading circuit, switch CR3 is still open so the loading circuit 50 remains deenergized with the compressor operating at full load. However, switch 2K2 closes while 2K3 opens and this results in deenergization of the speed circuit 52 and the throttle solenoid 18 so that the engine and compressor now operate at the lower speed. The pilot circuit 54 remains deenergized so that the three-way valve remains in a cooling position. Accordingly, the operation of the system is in the mode of low speed full cool corresponding to the block 58 in FIG. 3.

Upon a further reduction in temperature in the served space to the setpoint, the relay 1K is energized while relay 2K remains deenergized. With this condition, those elements which form a significant part of the invention come into play, specifically the control monitor 46 and the control auxiliary relay CR and its switch means. Upon energization of the heat relay 1K, its associated switch means 1K1 opens, 1K2 closes, and 1K3 also closes. This initiates operation of the control monitor 46 by power being available thereto through 2K1 and 1K3, to initiate power to the auxiliary control relay in a circuit which may be characterized as the auxiliary control circuit 60. Upon energization of CR, its associated switches CR1 closes, CR2 opens, and CR3 closes. CR1 is in what may be considered to be a latching circuit in that it maintains power through the control monitor 46 to CR even though the power initiating switch 1K3 opens. CR2 opens to insure continued deenergization of the speed circuit 52 (subject to a subsequent time delay condition) thereby reducing the compressor speed to its lower value. CR3 closes so that with 2K1 also closed, the loading circuit 50 is energized to obtain partly loaded operation of the compressor through energization of solenoid 20. Additionally, the system switches to heating by energization of the pilot solenoid 26 in the pilot circuit 54 through closing of switch 1K2. From this operating condition of low speed part heat (LSPH) corresponding to an operation in block 62 (FIG. 3), a number of changes of operating condition can occur depending upon temperature changes and time.

The time aspect turns on the operation of the control monitor 46 which in turn controls the auxiliary control relay CR, the monitor having a built-in time delay and functioning generally as follows. When power is initially supplied to the monitor 46, it is passed to the control relay CR to energize it. So long as relay 2K remains deenergized, and so long as no defrost operation is initiated, CR remains energized. However, if 2K is energized so that switch 2K3 closes, an "initiate" signal is delivered through line 64 to the control monitor and a predetermined fixed time delay period begins. If the signal continues for that period, such as eight minutes for example, then the control monitor operates to cut off the power to the control relay CR. If, however, the signal is interrupted during the time period, the control monitor resets to zero time and requires another initiation signal for the time delay period to begin.

The control monitor 46 can also turn off power to CR without a time delay when a signal is received to line 66, this signal being available when the defrost relay D is energized, causing closure of switch D1 and energization of the air damper solenoid circuit 68 which also includes damper solenoid 70.

Returning now to various modes of operation available, assume the temperature in the served space continues to drop to a degree that 2K is energized along with 1K. When this occurs, 2K1 opens so that the initiating power to the control monitor 46 is no longer available through the initiating circuit including 1K3. Opening of 2K1 also results in deenergization of the loading circuit so that the compressor is fully loaded. Closing of 2K3 results in the initiation of a timing signal to the control monitor 46 through line 64 but, since switch CR2 in the speed circuit remains open so long as CR is energized, the system continues to operate at low speed. With these conditions prevailing, and until the predetermined time period has expired without interruption (that is 2K has not become deenergized), the system will have a stage of operation of low speed full heat corresponding to the area 72 in FIG. 3. If the time period expires with 2K remaining energized, this time function being indicated by the dash line with the T to the left in FIG. 3, the control relay will be deenergized through the control monitor 46 with the CR switches returning to the position shown in FIG. 2 and the system will change from low speed full heat to high speed full heat through the additional energization of the speed circuit 52. The high speed full heat corresponds to the area 74 in the block of FIG. 3. If, however, the low speed full heat is adequate to warm the served space sufficiently that 2K is deenergized before the time period expires, then the CR switches will remain in their positions opposite that shown in FIG. 2 and closing of 2K1 in the loading circuit 50 will again result in reenergization of the loading circuit 50 so that the compressor operates in a partly loaded condition. This will then give low speed part heat operation corresponding to the area 76 in the block.

Upon a further rise in served space temperature above the setpoint temperature, 1K will be deenergized. Since both 1K and 2K are deenergized, the system will shift to cooling through the opening of 1K2 in the pilot circuit 54. This low speed part cool corresponds to the area 78 in FIG. 3.

On a further rise in the served space temperature to a point above the intermediate band 48 encompassing the setpoint temperature, 2K again becomes energized so that with opening of 2K1 in the loading circuit, full cooling is obtained, but at the low speed. This corresponds to the area 80 in FIG. 3 and this stage of operation will continue for the predetermined time if it is uninterruped by the deenergization of 2K. However, if the time period expires as indicated by the dash line with the T on the right, then the system will switch to high speed full cool corresponding to the area 82, this occurring because of the deenergization of the auxiliary control relay CR and the continued energization of the speed relay 2K.

It is to be noted that once the stage of operation with a descending temperature has reached area 62 of low speed part heat, so that the auxiliary control relay has initially been energized, thereafter so long as the control relay CR remains energized the system can operate in four stages of operation, all at low speed of the engine, so long as there is not an uninterrupted expiration of the time period of the time delay. These four stages of operation at low speed include both part heat and full heat, and part cool and full cool. It will of course be recognized that with respect to energy conservation, operating the engine at a reduced speed provides a significant advantage.

While the prior art circuit arrangement and control method using a thermostatic relay of the type here described yielded only four stages of operation, with the subject arrangement and control method an additional two stages of operation are available while using the tried and proven device and with a relatively modest increase in cost of the circuit as compared to an arrangement which would incorporate additional stages of control through a more sophisticated and additional stage thermostat and relay combination.

With respect to the operation of the circuit in a condition of defrost, the defrost is initiated automatically by closure of the switch 84 to energize the defrost relay D. The results in closure of switch D1 which provides a signal through line 66 to the control monitor 46 immediately cutting off power to the auxiliary control relay CR and according resulting in its control switch assuming the position shown in FIG. 2. Additionally, defrost switch D21 opens and D22 closes. This insures operation at high speed full heat irrespective of whether the heat and speed relays 1K and 2K, respectively, are energized or deenergized.

It is to be understood that the particular circuit shown and the references to specific devices such as the Thermoguard thermostat have been selected as exemplary for purposes of teaching the concepts of the invention, and this concept may well be applied with other circuits and other devices.

What is claimed is:

1. In a transport refrigeration system of the type having the capabilities of at least heating and cooling operations, and dual compressor speed operation, and having first relay means including switch means controlling heating and cooling operations, and second relay means including switch means controlling compressor speed operation, said first and second relay means being responsive to temperatures in the served space for controlling said system normally in at least four stages of operation in accordance with the differences in temperature of the served space from the setpoint temperature, two of said stages of operation including low speed compressor operation in the temperature band encompassing temperatures closely above and below said setpoint temperature, the improvement comprising:

auxiliary control relay means including switch means;
time delay means connected to control operation of said auxiliary control relay, said time delay means being connected to be controlled in a timed operation in accordance with the condition of said second relay following said first relay means having first operated to a heating condition position;
said auxiliary control relay being operative to maintain said compressor speed at a lower level until said time delay means operates to change the condition of said auxiliary control relay to thereby change said compressor speed to the higher level in accordance with said second relay calling uninterruptedly for a predetermined time period for compressor speed at a higher level.

2. In a system according to claim 1 including:
a circuit for said compressor speed control including speed control means providing high speed in an energized condition and low speed in a deenergized condition and, in series therewith, a switch of said auxiliary control relay means, and a switch of said second relay switch means.

3. In a system according to claim 2 wherein:
said speed control means comprises a solenoid.

4. In a system according to claim 2 including:
a second circuit including, in series, a second switch of said auxiliary control relay switch means, said auxiliary control, and said time delay means, said second switch being operated to and maintaining a closed position upon and in accordance with energization of said auxiliary control relay, said time delay means normally completing said second circuit to said auxiliary control relay for at least said predetermined time.

5. In a system according to claim 4 wherein:
said timing function of said time delay means is initiated upon closure of said switch means of said second relay in said speed control circuit.

6. In a system according to claim 4 wherein said system includes the additional capability of high and low capacity compressor operation in accordance with energization and deenergization of unloading means, and said system includes:
a load control circuit including, in series, said unloading means, a third switch of said auxiliary control relay switch means, and a second switch of said second relay means, said switches in said load control circuit having opposite normally closed and open position so that loaded operation of either cool or heat at the lower speed of the compressor is permitted for a period up to said predetermined time period expiration.

7. In a system according to claim 1 wherein:
said system includes defrost means;
means connecting said time delay means to receive a signal upon initiation of defrost;
said time delay means operating to a condition upon receipt of said signal to deenergize said auxiliary control relay means irrespective of the condition of said first and second relays and said predetermined time so that said system will operate in a condition of high speed heat.

8. In a transport refrigeration system of the type having the capabilities of at least heating and cooling operations, dual compressor speed operation, and different compressor loading operation, and having first relay means including switch means controlling heating and cooling operations, and second relay means including switch means controlling compressor speed operation, said first and second relay means being responsive to temperatures in the served space for controlling said system normally in at least four stages of operation in accordance with the differences in temperature of the served space from the setpoint temperature, two of said stages of operation including low speed compressor operation in a temperature band encompassing temperatures closely above and below said setpoint temperature, the improvement comprising:
a speed control circuit including solenoid means having a high and low speed condition in accordance with energization and deenergization, respectively, of said solenoid;
an auxiliary control circuit including time delay means and an auxiliary control relay in series;
a loading circuit including a loading solenoid having a loaded and less loaded condition in accordance with deenergization and energization, respectively, of said loading circuit;
a pilot control circuit including solenoid means for providing a cooling and heating operation in accordance with deenergization and energization, respectively, of said solenoid;
a first normally open switch of said control relay in said auxiliary control circuit;
a second normally closed switch of said auxiliary control relay, and a third normally open switch of said second relay in series with said speed solenoid in said speed circuit;

a third normally open switch of said auxiliary control relay, and a first normally closed switch of said second relay in series with said loading solenoid in said loading circuit;

a second normally open switch of said first relay in series with said pilot solenoid in said pilot circuit;

a third normally open switch of said first relay in an initiate circuit connected between said third switch of said auxiliary control relay and said first switch of said second relay in said loading circuit and said time delay means;

said time delay means being connected to control operation of said auxiliary control relay, said time delay means being connected to be controlled in a timed operation in accordance with the switch means of said second relay; said time delay means being initially energized to thereby provide energization of said control relay through said normally closed first switch of said second relay and said third switch of said first relay, continued energization of said time delay means and control relay being afforded by closure of said first switch of said control relay;

a time delay initiation circuit including said third switch of said second relay and a line connected to said time delay means so that initiation of a time period occurs with said time delay means energized upon closure of said third switch of said second relays; said compressor operating at said lower speed with said speed solenoid deenergized through the open position of said second switch of said control relay until a predetermined time period expires with said third switch of said second relay remaining closed uninterruptedly.

9. In a system according to claim 8 wherein:
said closed position of said third switch of said control relay and said normally closed position of said first switch of said second relay in said loading circuit maintain energization of said loading solenoid during operation in said temperature band, and opening of said first switch of said second relay upon a change in served space temperature to outside said band results in deenergization of said loading solenoid and higher loading of said compressor.

10. In a method of controlling a transport refrigeration system of the type having at least heating and cooling capability and dual compressor speed capability and having at least four stages of operation produced in accordance with temperatures in the served space varying more or less and above and below the setpoint temperature of the served space, the improved steps of:

operating said compressor at the lower speed when the temperatures in said served space are in a relatively close range both above and below the setpoint temperature, and said served space temperature has dropped to below said setpoint temperature;

overriding a call for operation of the compressor at the higher speed as sensed temperatures in the served space move either above or below said relatively close range until at least a predetermined period of time elapses with an uninterrupted call for high speed operation existing; and then operating said compressor at said higher speed.

11. In the method of claim 10, wherein the system also includes a capability of unloading said compressor, the additional steps of:

operating said compressor in at least partly unloaded condition in response to said served space temperature being in said relatively close range of temperature and said served space temperature having dropped to below said setpoint temperature; and shifting said compressor operation to a more fully loaded condition as the temperature in said served space moves either above or below said relatively close range while maintaining said lower speed of said compressor through said overriding operation as specified in claim 10.

12. In a system according to claim 1 wherein said system includes the additional capability of high and low capacity compressor operation in accordance with energization and deenergization of unloading means, and said system includes:

a load control circuit including switches controlled by said auxiliary control relay and said second relay operative to positions to place said load control circuit in a first condition for unloaded compressor operation in response to said served space temperature having dropped to below said setpoint temperature and remaining in said temperature band, and to place said load control circuit in a second and opposite condition for loaded compressor operation in response to served temperatures falling below or rising above said temperature band so that said system has the capability of providing six distinct stages of operation.

* * * * *